United States Patent
Zampa et al.

(10) Patent No.: US 12,365,955 B2
(45) Date of Patent: Jul. 22, 2025

(54) DIRECT REDUCTION SYSTEM AND RELATED PROCESS

(71) Applicants: DANIELI & C. OFFICINE MECCANICHE S.p.A., Buttrio (IT); HYL TECHNOLOGIES, S.A. DE C.V., Nuevo León (MX)

(72) Inventors: Massimiliano Zampa, Udine (IT); Stefano Maggiolino, Nuevo Leon (MX)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 824 days.

(21) Appl. No.: 17/427,537

(22) PCT Filed: Feb. 13, 2020

(86) PCT No.: PCT/EP2020/053758
§ 371 (c)(1),
(2) Date: Jul. 30, 2021

(87) PCT Pub. No.: WO2020/165342
PCT Pub. Date: Aug. 20, 2020

(65) Prior Publication Data
US 2022/0098686 A1 Mar. 31, 2022

(30) Foreign Application Priority Data
Feb. 13, 2019 (IT) .................. 102019000002081

(51) Int. Cl.
*C21B 13/00* (2006.01)
*F27D 17/30* (2025.01)

(52) U.S. Cl.
CPC ........ *C21B 13/0073* (2013.01); *C21B 13/004* (2013.01); *F27D 17/30* (2025.01)

(58) Field of Classification Search
CPC .. C21B 13/0073; C21B 13/004; F27D 17/001
(Continued)

(56) References Cited

U.S. PATENT DOCUMENTS 4,348,226 A * 9/1982 Aoki ................... C21B 13/0073
75/496
4,370,162 A * 1/1983 Dominguez-Ahedo ....................
C21B 13/0073
266/140
(Continued)

FOREIGN PATENT DOCUMENTS

AU 2013355711 A1 7/2015
DE 4326562 A 8/1993
(Continued)

OTHER PUBLICATIONS

English translation of DE4326562A is provided in U.S. Pat. No. 5,545,251 issued Aug. 13, 1996.
(Continued)

*Primary Examiner* — Jessee R Roe
*Assistant Examiner* — Michael Aboagye
(74) *Attorney, Agent, or Firm* — Stetina Garred Brucker & Newboles (57) ABSTRACT

A direct reduction system for a direct reduction of iron ore, comprising a reactor having a reduction area and being adapted to be loaded from above with said iron ore; a treatment and feeding line, to process the process gases, thus obtaining a reducing gas mixture, and feed said reducing gas mixture into the reduction area; a line for recovering and treating an exhausted gas exiting the reactor, communicating upstream with the reactor and downstream with said treatment and feeding line; wherein at least one bypass duct is provided, adapted to divert at least one portion of reducing gas mixture from said treatment and feeding line to said recovery and treatment line.

18 Claims, 3 Drawing Sheets

(58) Field of Classification Search
USPC ..... 266/78, 144, 156, 172; 75/441, 443, 505
See application file for complete search history.

(56) References Cited

U.S. PATENT DOCUMENTS

| | | | | |
|---|---|---|---|---|
| 4,439,233 | A | * | 3/1984 | Faccone .................. C21B 13/02 75/498 |
| 4,702,766 | A | * | 10/1987 | Love ....................... C21B 13/02 75/495 |
| 4,752,329 | A | * | 6/1988 | Freeland ................. C21B 13/02 266/82 |
| 5,413,622 | A | | 5/1995 | Greenwalt |
| 8,377,168 | B2 | * | 2/2013 | Zendejas-Martinez ..................... C21B 13/0073 75/505 |
| 2002/0007699 | A1 | * | 1/2002 | Montague ............... C01B 3/363 75/380 |

FOREIGN PATENT DOCUMENTS

| | | | |
|---|---|---|---|
| DE | 19717750 | A | 4/1997 |
| JP | 2013108109 | A | 6/2013 |
| KR | 2005 0054849 | A | 6/2005 |
| WO | 2018/024767 | A1 | 2/2018 |

OTHER PUBLICATIONS

English translation of DE19717750A is provided in U.S. Pat. No. 6,423,116 B1 issued Jul. 23, 2002.
International Search Report and Written Opinion for International Application No. PCT/EP2020/053753, Jun. 4, 2020, 10 pages.

\* cited by examiner

DIRECT REDUCTION SYSTEM AND RELATED PROCESS

CROSS-REFERENCE TO RELATED APPLICATIONS

This application claims priority to PCT International Application No. PCT/EP2020/053758 filed on Feb. 13, 2020, which application claims priority to Italian Patent Application No. 102019000002081 filed on Feb. 13, 2019, the disclosures of which are expressly incorporated herein by reference.

STATEMENT RE: FEDERALLY SPONSORED RESEARCH/DEVELOPMENT

Not applicable.

BACKGROUND OF THE INVENTION

Field of the Invention

The present invention relates to a direct reduction system and to a related process, particularly adapted to produce metal iron by means of a direct reduction of iron ore using reducing gas.

Background Art

The systems for the production of reduced iron (DRI) of the known type consist of a reaction chamber or reactor, in which iron oxide is loaded in the form of pellets and/or lumps, and of a reducing gas treatment and feeding line adapted to reduce said iron oxide in the reactor. In the reaction chamber, or reactor, the reducing gas is injected at high temperature. In direct reduction systems comprising a shaft-type moving-bed reactor having a reduction zone, the reducing gas is introduced into the lower part of the reduction zone of the reactor and is brought upstream through the iron oxide bed to be then extracted from the top of said reduction zone as exhausted gas, reconditioned and recirculated. The exhausted gas exiting the reactor is subject to an appropriate treatment comprising being dedusted, deprived of reaction products ($H_2O$ and $CO_2$) and compressed; it is then mixed with a make-up gas, typically make-up natural gas. The gas flow, defined by the mixture of the new make-up gas and of the exhausted gas recycled after the above mentioned treatment, is sent to a heating unit which brings it to the temperature required by the reduction process, usually over 850° C. Said heating unit can be a fired heater or a methane reformer.

The heated reducing gas flow, in which oxygen is injected so as to further increase the temperature thereof, is finally sent into the reactor, in which pellets and/or lumps of ores containing iron oxides to be reduced are introduced from above, while, at the opposite end, the DRI (direct reduction iron product) is extracted, which is sent to a melting furnace by means of a pneumatic or gravity transport system or by means of belts.

More in detail, during the iron oxide reduction process, the oxygen is removed from the iron ore by means of chemical reactions with hydrogen and carbon monoxide, so as to obtain DRI with a high degree of metallization (ratio of metal iron to total iron contained in the DRI). The overall reduction reactions involved in the process are well known and are shown below:

$$Fe_2O_3 + 3H_2 \rightarrow 2Fe + 3H_2O \quad (1)$$

$$Fe_2O_3 + 3CO \rightarrow 2Fe + 3CO_2 \quad (2).$$

Hydrogen and carbon monoxide, reacting with the oxygen of the iron oxide, are turned into water and carbon dioxide according to reactions (1) and (2). In the exhausted gas exiting the reactor, in addition to $H_2O$ and $CO_2$, also unreacted $H_2$ and CO are present. In order to recover and recycle these reducing agents $H_2$ and CO, the exhausted gas is processed as described above.

The reduction of the iron oxides is carried out at high temperature in the reduction reactor and the DRI produced can be discharged from said reactor at high temperature.

Disadvantageously, when the melting furnace is undergoing maintenance or is temporarily halted for production reasons, the DRI production which is not received by the melting furnace must be diverted to other treatment lines which normally give a cold final product. To avoid the continuous stopping and re-starting of the direct reduction system, the hot-discharge reactor always has an alternative possibility of cooling down by means of an external cooler, which can be loaded by gravity or by pneumatic transport. The cold DRI produced must be stored in suitable inert silos, so as to avoid the risk of the product being re-oxidized by reaction of its metallic iron with the oxygen and water of air. Alternatively, the material can be briquetted (producing HBI) involving an additional processing cost, thus ensuring a high stability of the product, which can be transported and stored without particular precautions.

This DRI cooling, however, involves the installation of cooling, transport and storage systems for the cold DRI, making the layout of the reduction system considerably complex.

Furthermore, when the melting furnace requires being fed again, the cold DRI loaded into the melting furnace causes a greater energy consumption during the melting step, as compared with the energy consumption of melting hot-charged DRI.

Therefore, the need is felt to provide a direct reduction system and a related process capable of overcoming the aforesaid drawbacks.

SUMMARY OF THE INVENTION

It is an object of the present invention to provide a direct reduction system which allows temporarily regulating the flow rate of reducing gas towards the reactor, maintaining the normal operating conditions of the gas heating or reforming unit and thus adapting the production rate of the direct reduction system to the production requirements of the melting furnace, without needing to divert the discharge of hot DRI from the reactor towards the production of cold DRI in the case of a halt of the melting unit for steel production, whereby the invention allows accelerating the production of hot DRI up to the nominal level of the reactor when the melting furnace requires maximum feeding and halting the production when it does not require it. The invention results in a considerable simplification of the layout of the reduction system, as the installation of cooling, transport and storage systems for cold DRI are not required.

It is another object of the present invention to provide a related direct reduction process.

The present invention achieves at least one of such objects, and other objects which will become apparent in the light of the present description, by means of an iron oxide direct reduction system which comprises a reactor having a reduction area and being adapted to be loaded from above with said iron oxides;

a treatment and feeding line for treating process gas, thus obtaining a reducing gas mixture, and for feeding said reducing gas mixture into the reduction area;

a recovery and treatment line for recovering and treating an exhausted gas exiting the reactor, communicating upstream with the reactor and downstream with said treatment and feeding line;

wherein at least one bypass duct is provided, adapted to divert at least one portion of said reducing gas mixture from said treatment and feeding line to said recovery and treatment line;

wherein there are provided at least one first regulation valve for regulating the portion of the reducing gas mixture which, by means of said at least one bypass duct, reaches the recovery and treatment line;

at least one second regulation valve for regulating the passage of exhausted gas exiting the reactor along the recovery and treatment line;

at least one control device for controlling said at least one first regulation valve and said at least one second regulation valve;

and wherein said control device is adapted to receive a first signal indicative of a discharge flow rate of DRI from the reactor and to produce a second signal for controlling the at least one first regulation valve and a third signal for controlling the least one second regulation valve.

There is provided at least one sensor for detecting the real time discharge flow rate of DRI from the reactor and sending said first signal to the control device. Given a predetermined feeding request of the melting electric furnace, placed downstream of the reactor, the control device consequently produces the second signal and the third signal so as to reach or maintain the desired discharge flow rate of DRI from the reactor.

The treatment and feeding line can comprise a heating or reforming unit.

The recovery and treatment line can comprise a pumping device.

According to a further aspect of the invention, a direct reduction process is provided, which can be carried out by means of the aforesaid system, which comprises the following steps:

a) feeding said reducing gas mixture into the reduction area of the reactor by means of the treatment and feeding line;

b) recovering and treating the exhausted gas exiting the reactor by means of the recovery and treatment line communicating downstream with said treatment and feeding line;

wherein there is provided a deviation of at least one portion of the reducing gas mixture from said treatment and feeding line to said recovery and treatment line by means of the at least one bypass duct;

wherein there are provided the steps of regulating, by means of said at least one first regulation valve, the at least one portion of the reducing gas mixture which, by means of said at least one bypass duct, reaches the recovery and treatment line;

regulating, by means of said at least one second regulation valve, the passage of exhausted gas exiting the reactor along the recovery and treatment line;

controlling said at least one first regulation valve and said at least one second regulation valve by means of said at least one control device;

and wherein said at least one control device receives a first signal indicative of a discharge flow rate of DRI from the reactor and produces a second signal, for controlling the at least one first regulation valve, and a third signal for controlling the least one second regulation valve.

The solution of the invention allows the direct reduction system to operate with a variable productivity, depending on the request for material originating from the melting furnace. The reducing gas feeding circuit is designed so as to allow a regulation of the flow towards the reactor. In essence, only the amount of reducing gas needed to ensure the productivity currently required by the melting furnace is taken from the reducing gas feeding circuit, external to the reactor.

In particular, the direct reduction system of the present invention includes varying the productivity of the system depending on the needs of the melting furnace, inserting a bypass branch or duct into the reducing gas feeding circuit, so as to modulate, possibly until completely halting, the input of the reducing gas into the reactor. This bypass branch is used when the melting furnace does not need to receive, or needs less, material: this involves the deviation of the reducing gas and the recirculation thereof externally to the reactor until the melting furnace returns to be capable of receiving material to be melted. This allows slowing down or halting the production of DRI of the direct reduction system without stopping the system.

In one embodiment the bypass branch connects the stretch of the reducing gas treatment and feeding line, preferably comprised between an oxygen injection device, placed downstream of the heating or reforming unit, and the reactor, with the stretch of the exhausted gas recovery and treatment line, preferably comprised between the reactor and a pumping device for pumping the treated exhausted gas towards said treatment and feeding line.

In a further embodiment, the bypass branch preferably connects the stretch downstream of the heating or reforming unit of the reducing gas treatment and feeding line with the stretch between the exhausted gas washing unit and the condensing unit along the exhausted gas recovery and treatment line.

Such a bypass branch can include a quenching or rapid cooling system which allows reducing the temperature of the gas passing therethrough.

Optionally, between the reactor of the direct reduction system and the melting furnace, only one or more intermediate depressurization tanks can be provided, with a considerable simplification of the steelmaking plant. Such intermediate tanks, in which the DRI produced is temporarily stored, allow a controlled feeding flow of material to be melted in the melting furnace.

The following are some of the main advantages of the system of the invention:

the installation of cooling, transport and storage systems for the cold DRI is not required, considerably simplifying the layout of the system;

the possibility of always loading hot DRI into the melting furnace, maximizing energy savings during the melting step;

it represents an ideal solution for markets where there is little availability of scrap;

the possibility of a complete control of the steel composition (no impurities or contamination, for example, of copper);

greater respect for the environment by virtue of the lower emissions of carbon dioxide.

Further features and advantages of the invention will become more apparent in view of the detailed description of exemplary, but not exclusive, embodiments.

The dependent claims describe particular embodiments of the invention.

BRIEF DESCRIPTION OF THE FIGURES

In the description of the invention, reference is made to the attached drawings, provided by way of explanation and not by way of limitation, in which.

DETAILED DESCRIPTION OF EXEMPLARY EMBODIMENTS OF THE INVENTION

With reference to the Figures, an example is shown of a direct reduction system for a direct reduction of iron ore oxides, by means a reaction with a reducing gas mixture derived from a process gas, the system comprising a circuit provided with:
- a reactor 1, preferably a single stage reactor, having a reduction area 2 and being adapted to be loaded from above with particles containing iron ore oxides;
- a treatment and feeding line 11 for treating process gas, thus obtaining a reducing gas mixture, and for feeding said reducing gas mixture into the reduction area 2;
- a recovery and treatment line 10 for recovering and treating an exhausted gas exiting the reactor 1, said line 10 communicating upstream with the reactor 1 and downstream with said treatment and feeding line 11;
- an external source 26 of make-up reducing gas which supplies make-up reducing gas to the treatment and feeding line 11.

Such a make-up reducing gas can be natural gas or any other gas having reducing properties, such as reformed gas, hydrogen, synthesis gas, coke oven gas (COG), etc.

In this description, "process gas" means the make-up reducing gas coming from the external source 26, in case the exhausted gas exiting the reactor 1 is not recycled, or means the gas mixture obtained by mixing the make-up reducing gas coming from the external source 26 with the exhausted gas treated in the recovery and treatment line 10; while "reducing gas mixture" means the aforesaid process gas, once treated in the treatment and feeding line 11, i.e., humidified (optionally), heated and treated with the oxygen injection.

Advantageously, the circuit is provided with at least one bypass duct 30, for example a single bypass duct, to divert at least one portion of the reducing gas mixture from the treatment and feeding line 11 to the recovery and treatment line 10. This allows regulating the flow of reducing gas towards the reactor, adapting the flow rate of the reducing gas mixture to the DRI production rate of the direct reduction system and in turn to the production requirements of the DRI melting furnace arranged downstream of the system. Preferably, the DRI melting furnace is an electric arc furnace (EAF) arranged downstream of the reactor 1.

Preferably, there is provided at least one regulation valve 32 for regulating the portion of the reducing gas mixture which, through the bypass duct 30, reaches the recovery and treatment line 10. In the case of two or more bypass ducts, each bypass duct will be provided with at least one regulation valve.

To better adapt the production rate of the direct reduction system to the production requirements of the furnace, a regulation device for regulating the loading of iron ore, which is introduced from above into the reactor 1, is provided. Such a regulation device comprises, for example, a rotary valve which, depending on the speed thereof, advantageously regulates the exiting discharge flow rate of iron ore and consequently also the iron ore feeding towards the reactor 1.

Also, a vibrating feeder 54 (FIG. 3) can be provided at the lower end of the reactor 1 in order to regulate the discharge flow rate of DRI from the reactor, in a manner coordinated with the regulation of the flow rate of iron ore introduced from above in the reactor.

A further advantage can be the provision of a cooling unit 31 along the bypass duct 30, to cool down the aforesaid portion of reducing gas mixture, allowing the decrease of the temperature of the gas passing through the duct 30 before reaching the exhausted gas present in the recovery and treatment line 10.

By way of example, this cooling unit 31 can comprise a cooling water injection device and a gas-liquid separator, for example in the form of a knock-out drum.

Figure 1:
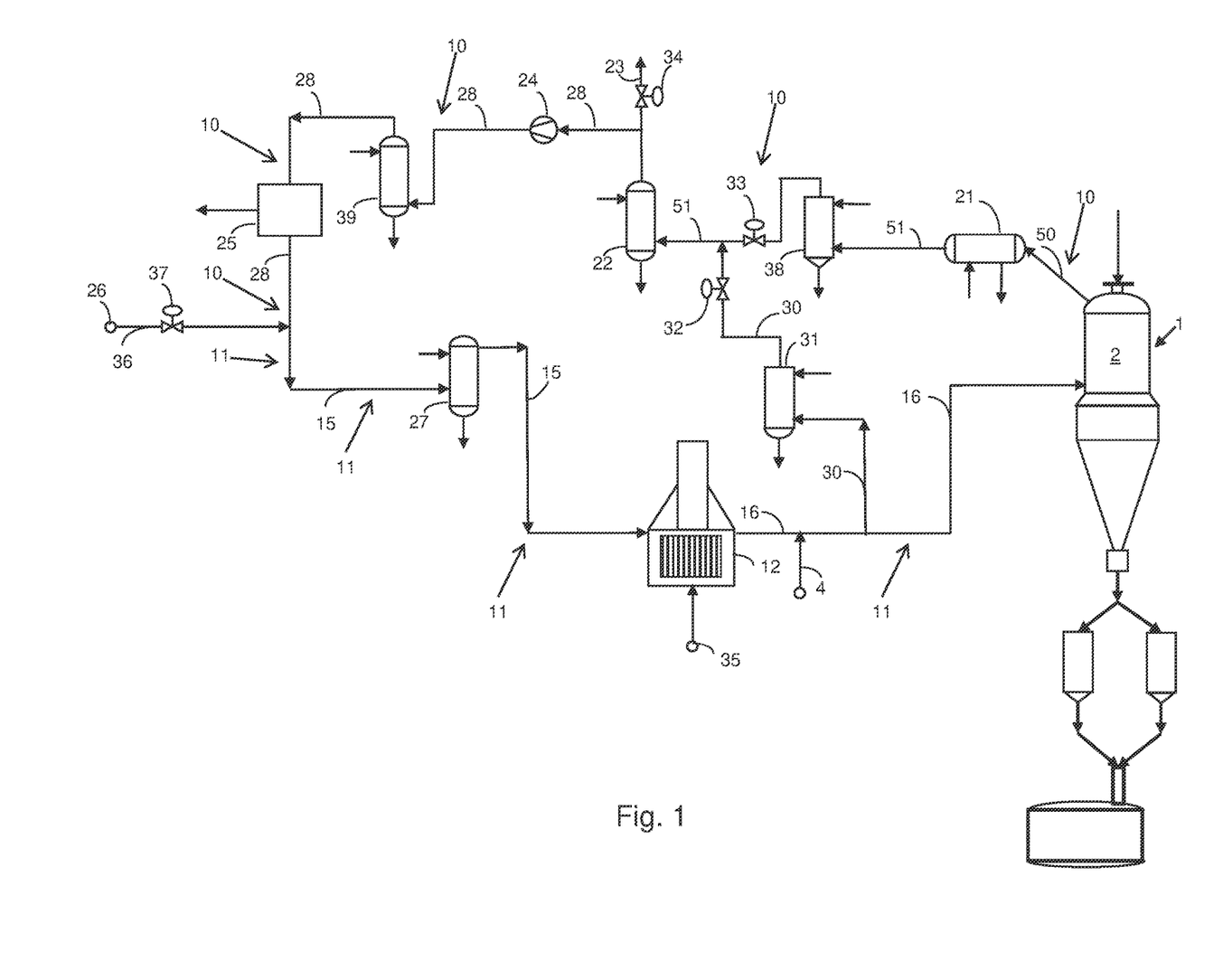
FIG. 1 shows a diagram of a first embodiment of a direct reduction system according to the invention.

In a first embodiment shown in FIG. 1, the treatment and feeding line 11 comprises:
- the ducts through which the process gas, obtained by mixing the treated exhausted gas exiting the reactor and the make-up reducing gas of the external source 26, is adapted to pass;
- optionally, at least one process gas humidification unit 27, for example only one humidification unit 27;
- at least one heating unit or reforming unit 12, for example, only one heating unit or reforming unit 12;
- and at least one injection device 4, for example only one injection device 4, arranged downstream of the heating unit 12 and adapted to inject oxygen into the flow of process gas.

The recovery and treatment line 10, instead, comprises:
- the ducts through which the exhausted gas, exiting the reactor 1, is adapted to pass;
- at least one heat exchanger 21, for example only one heat exchanger, to cool down the exhausted gas exiting the reactor 1;
- at least one washing unit 38 for washing the exhausted gas, for example only one washing unit, adapted to wash the exhausted gas with washing water and separate the exhausted gas from the washing water;
- at least one condensing unit 22, for example only one condensing unit, arranged downstream of said at least one washing unit 38, to remove water from the exhausted gas, thus obtaining a dehydrated gas.

Downstream of the condensing unit 22, at least one pumping device 24, for example only one pumping device, to pump the dehydrated gas towards the treatment and feeding line 11, a cooling device 39 for cooling said dehydrated gas, and a removal device 25 for the removal of carbon dioxide can be provided in sequence.

Preferably, the ducts of the recovery and treatment line 10, downstream of the condensing unit 22, comprise:
- a branching duct 23, connecting the recovery and treatment line 10 to the burners of the heating unit 12, and in which a first flow of dehydrated exhausted gas can be sent as fuel gas for said burners;
- and a branching duct 28, connecting the recovery and treatment line 10 to the treatment and feeding line 11 and along which the pumping device 24, the cooling device 39 and the carbon dioxide removal device 25 are arranged, and in which a second flow of dehydrated exhausted gas is recirculated.

Along the branching duct 23, a pressure control valve 34 is preferably provided.

The heating unit 12 is powered by the combustion of an appropriate fuel originating from a source 35. The fuel can be dehydrated exhausted gas, originating from the branching duct 23, or hydrogen or natural gas or a mixture thereof.

In one embodiment (FIG. 1), the at least one bypass duct 30 connects a stretch of the treatment and feeding line 11, located downstream of the at least one injection device 4, to a stretch of the recovery and treatment line 10, located between the at least one washing unit 38 and the condensing unit 22.

Preferably, at least one further regulation valve 33 is provided along the recovery and treatment line 10, to regulate the passage of exhausted gas from the washing unit 38 towards the condensing unit 22.

More generally, it is sufficient that the at least one bypass duct 30 connects a stretch of the treatment and feeding line 11, located downstream of the at least one heating or reforming unit 12, preferably downstream or upstream of the at least one injection device 4, to a stretch of the recovery and treatment line 10, located between the reactor 1 and the at least one pumping device 24.

The treatment and feeding line 11 is connected upstream both to the recovery and treatment line 10 and to the external source 26 of make-up reducing gas. In particular, the external source 26 is connected to a stretch of the circuit comprised between the carbon dioxide removal device 25 of the recovery and treatment line 10 and the heating unit 12 of the treatment and feeding line 11. Along the duct 36, connecting the external source 26 to the treatment and feeding line 11, a pressure control valve or regulation valve 37 is provided.

Optionally, at least one humidification unit 27 can be provided between the external source 26 and the heating unit 12, along the treatment and feeding line 11.

Figure 2:
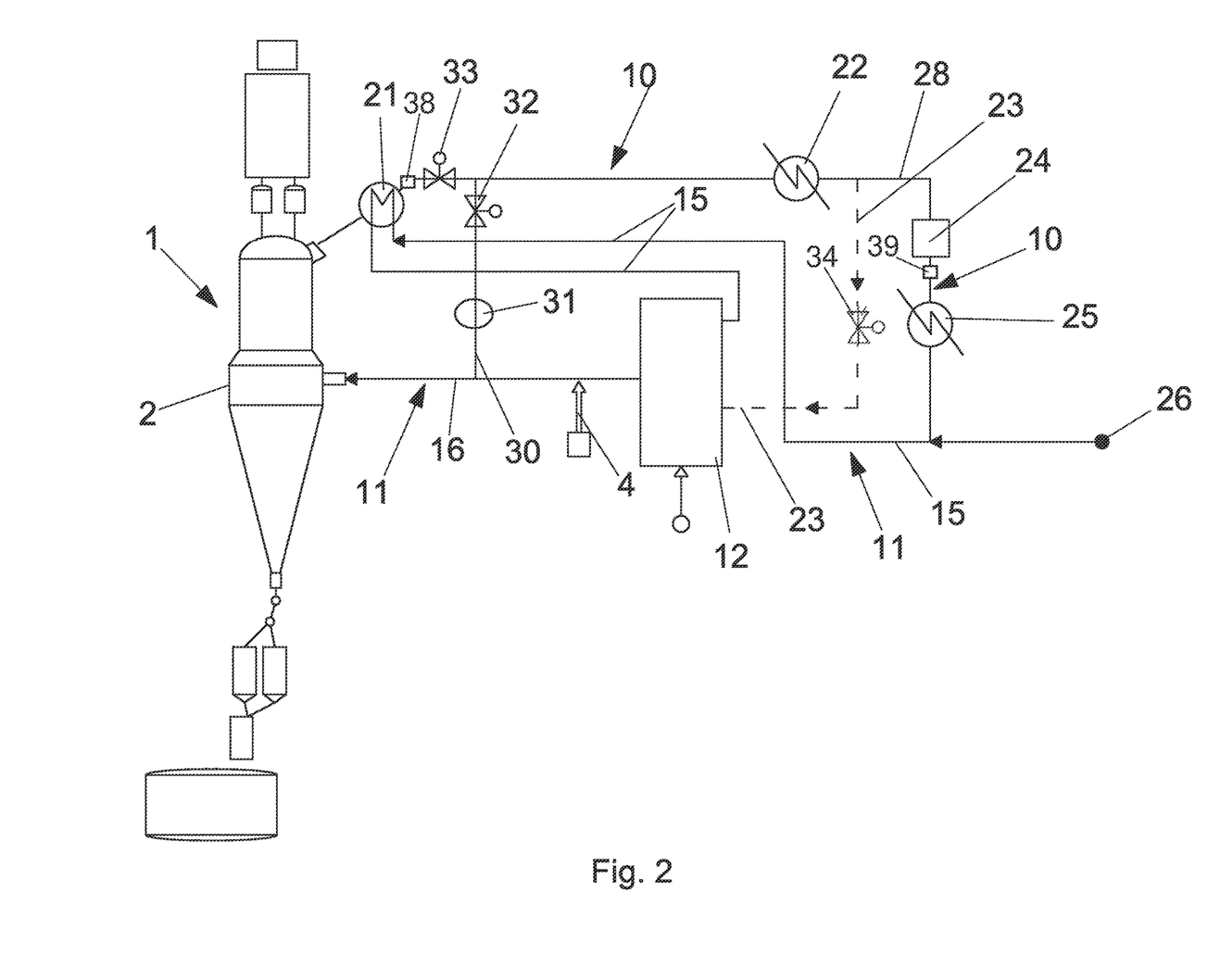
FIG. 2 shows a diagram of a second embodiment of a direct reduction system according to the invention.

A second embodiment of the system of the invention, shown in FIG. 2, is substantially equal to the first embodiment and provides for a duct 15 of the treatment and feeding line 11, adapted to be crossed by the process gas, to pass through the at least one heat exchanger 21 of the recovery and treatment line 10 for preheating the process gas upstream of the heating unit 12, exploiting the heat of the exhausted gas just exiting the reactor 1. In this configuration, the source of make-up reducing gas is a source of reformed gas or hydrogen, and the process gas humidification unit 27 is not required.

Figure 3:
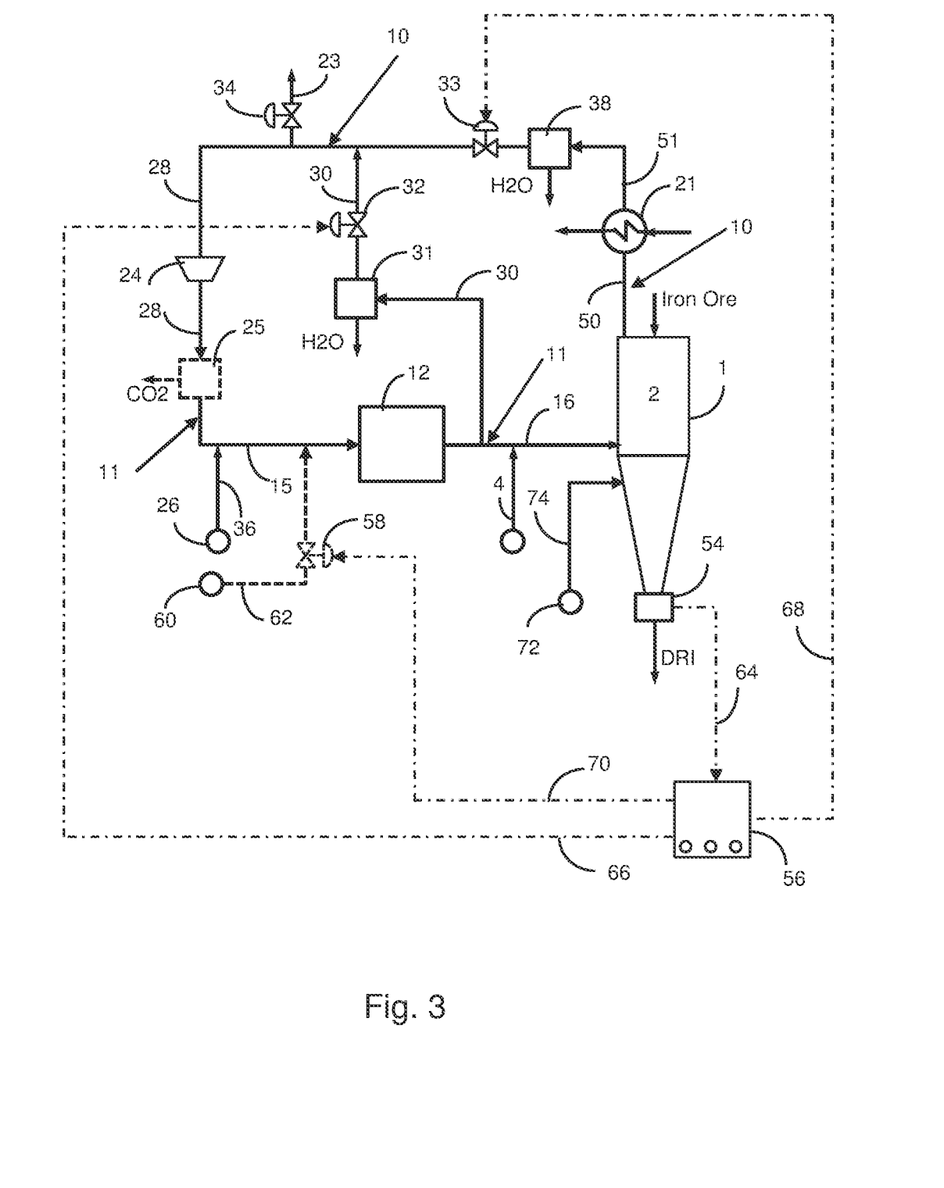
FIG. 3 shows a diagram of a third embodiment of a direct reduction system according to the invention.

A third embodiment of the system of the invention, shown in FIG. 3, is substantially similar to the first and second embodiments.

In this third embodiment there is further provided a control device 56 for controlling the at least one regulation valve 32, which regulates the portion of the reducing gas mixture that, through the bypass duct 30, reaches the recovery and treatment line 10, and for controlling the at least one regulation valve 33, which regulates the passage of exhausted gas, coming from the reactor 1, along the recovery and treatment line 10.

Said control device 56 can be programmed to operate in response to a desired DRI discharge flow rate, preferably in response to a predetermined DRI charging flow rate which must enter the melting electric furnace, for example an EAF.

The control device 56 is adapted to receive a first signal 64 indicative of the real time discharge flow rate of DRI from the reactor 1, and is configured to produce a second signal 66 sent to the regulation valve 32 and a third signal 68 sent to the regulation valve 33.

There is provided at least one sensor for detecting the discharge flow rate of DRI from the reactor 1 and sending said first signal to the control device 56. Given a predetermined feeding request of the melting electric furnace, placed downstream of the reactor 1, the control device 56 consequently produces the second signal and the third signal so as to reach or maintain the desired discharge flow rate of DRI from the reactor 1.

If the discharge flow rate of the DRI is to be reduced, the control device 56 would send to the control valve 32 a signal for increasing the portion of the reducing gas mixture which is diverted to the recovery and treatment line 10, while said control device would send to the regulation valve 33 a signal for decreasing the flow rate of the exhausted gas coming from the reactor 1, and therefore overall decreasing the flow rate of the reducing gas mixture towards the reactor 1. Optionally, the control device 56 can also send a signal to the regulating valve 37 (FIG. 1) that regulates the flow rate of the make-up reducing gas entering the treatment and feeding line 11.

If a reformer of hydrocarbons, typically reforming methane in natural gas, is provided as a reforming unit 12, in which the methane reacts with $CO_2$ and $H_2O$ present in the exhausted gas coming from the recovery and treatment line 10, a further external source 60 is preferably provided to supply $CO_2$ and $H_2O$ upstream of said reforming unit 12.

The further external source 60 is connected to a stretch of the circuit between the connection point of the duct 36 to the treatment and feeding line 11 and the aforementioned reforming unit 12. Along the duct 62, which connects the external source 60 to the treatment and feeding line 11, a regulation valve 58 is provided.

In this case the control device 56 is also configured to produce a fourth signal 70 sent to the regulation valve 58.

Therefore, if the discharge flow rate of the DRI is to be reduced, the control device 56 would send a signal also to the regulation valve 58 for increasing the supply of $CO_2$ and $H_2O$, considering the simultaneous decrease of the exhaust gas flow rate coming from the reactor 1. In this way the reforming unit 12 can continue its normal operation without any problem of carbide formation caused by a lower amount of $CO_2$ and $H_2O$ compared to the amount of methane introduced into the reformer.

In this third embodiment, preferably the washing unit and the condensing unit can be joined in a single unit 38 (FIG. 3). Furthermore, the removal device 25 for the removal of carbon dioxide is an optional device.

Preferably, it is possible to provide an external source 72 (FIG. 3) of a gas for carburizing the DRI, such as methane or other gaseous hydrocarbons or carbon monoxide. This source 72 can feed, preferably directly through the duct 74, said DRI carburizing gas to the reactor 1 at a point located below the feed inlet of the reducing gas mixture in said reactor in order to regulate the carbon content of the DRI. Said external source 72 can also be provided in the other embodiments described above.

With regard to the direct reduction process which can be carried out by means of the system of the invention, the process essentially comprises the following steps:
a) feeding the reducing gas mixture into the reduction area 2 of the reactor 1 by means of the treatment and feeding line 11;
b) recovering and treating the exhausted gas exiting the reactor 1 by means of the recovery and treatment line 10 communicating downstream with the treatment and feeding line 11.

The following is an example of a full-performance iron ore direct reduction process, carried out by means of the system of the invention just described.

The exhausted gas exiting the reactor 1, preferably at a temperature within the range from about 250° C. to about 450° C., is channeled into a duct 50 of the recovery and treatment line 10 which leads it to the heat exchanger 21 for a cooling thereof.

Once the exhausted gas has cooled down, it flows through a duct 51 towards the washing unit 38 and subsequently towards the condensing unit 22 to remove water, thus obtaining a dehydrated exhausted gas. In a variant, the washing unit and the condensing unit can be merged in a single unit 38 (FIG. 3).

After the cooling, washing and dehydration, the dehydrated exhausted gas is divided into the two branching ducts 23, 28.

A minor portion of dehydrated exhausted gas flows through duct 23, having a pressure control valve or regulation valve 34 through which a part of the gas can be cleaned out the circuit to eliminate unwanted accumulations of inert gases. The larger portion of dehydrated exhausted gas flows instead through the duct 28.

With reference to the Figures, the dehydrated exhausted gas flowing into the duct 28 is pushed by the pumping device 24, which can be a compressor or a blower, so as to recycle such a portion of dehydrated exhausted gas to bring it back to the reactor 1. Downstream of the pumping device 24, the dehydrated exhausted gas flows through the duct 28, passes through the possible cooling device 39 and subsequently passes through the removal device 25 getting rid of carbon dioxide, and is therefore mixed in the treatment and feeding line 11 with the make-up reducing gas originating from the external source 26, for example natural gas or any other gas having reducing properties, such as reformed gas, hydrogen, synthesis gas, COG, etc., thus defining the process gas. In a variant (FIG. 3), the removal of carbon dioxide by means of the removal device 25 is an optional step.

This process gas continues flowing along the duct 15 where it is optionally subjected to a preheating, since the duct 15, with a stretch thereof, can pass through the heat exchanger 21 of the recovery and treatment line 10 (FIG. 2).

In any case, the process gas, with or without this preheating, passes through the whole duct 15 until it arrives to the heating or reforming unit 12 where it reaches a temperature of about 850-960° C.

Downstream of the heating or reforming unit 12, the reducing gas mixture, also obtained by injecting oxygen by means of the at least one injection device 4, flows through the duct 16 until reaching the inside of the reactor 1.

The iron oxide ore, in the form of pellets or lumps, is fed from above into the reduction area 2 of the reactor 1, reacts with the hot reducing gas flowing upstream with respect thereto, and is finally discharged as Hot DRI.

Advantageously, when regulating the flow of reducing gas towards the reactor is required, thus adapting the production rate of the direct reduction system to the production requirements of the melting furnace arranged downstream of the system, there is provided a deviation of at least one portion of the reducing gas mixture, from the treatment and feeding line 11 to the recovery and treatment line 10 by means of the at least one bypass duct 30.

The regulation of the portion of reducing gas mixture which, passing through the bypass duct 30, reaches the recovery and treatment line 10, occurs by means of the regulation valve 32.

Similarly, by means of the regulation valve 33, it is possible to regulate the passage of exhausted gas along the recovery and treatment line 10, for example from the washing unit 38 towards the condensing unit 22.

By suitably decreasing the amount of reducing gas introduced into the reactor 1, it is also possible to regulate, accordingly, the amount of iron ore loaded from above into the reactor 1.

With the system of the invention, it is therefore possible to avoid the deviation of the discharge of the reactor towards a DRI cooler for the production of cold DRI in the case of a halt of the steel system, and to allow accelerating the production up to the nominal level when the melting furnace requires maximum feeding and even halting the production when it does not require it, without the operative limitations inherent to a fired heater or reformer. This results in a considerable simplification of the layout of the reduction system, as the installation of cooling, transport and storage systems for the cold DRI is not required.

Advantageously, a cooling of said portion of the reducing gas mixture along the bypass duct 30 can be provided by means of the cooling unit 31.

During a full-performance operating step, different from the starting step, the temperature of the portion of the reducing gas mixture entering the cooling unit 31 is, for example, in the range of 850-960° C., while the temperature of said portion of reducing gas mixture exiting the cooling unit 31 is, for example, in the range of 40-180° C.

The invention claimed is:

1. A direct reduction system for a direct reduction of iron oxides, comprising
a reactor having a reduction area and being adapted to be loaded from above with said iron oxides;
a recovery and treatment line for recovering and treating an exhausted gas exiting the reactor;
a treatment and feeding line for treating process gas, thus obtaining a reducing gas mixture, and for feeding said reducing gas mixture into the reduction area;
wherein the recovery and treatment line communicates upstream with the reactor and downstream with said treatment and feeding line, and the treatment and feeding line is connected upstream both to the recovery and treatment line and to at least one source of make-up reducing gas;
wherein at least one bypass duct is provided, adapted to divert at least one portion of said reducing gas mixture from said treatment and feeding line to said recovery and treatment line;
wherein there are provided
at least one first regulation valve for regulating the portion of the reducing gas mixture which, by means of said at least one bypass duct, reaches the recovery and treatment line;
at least one second regulation valve for regulating a passage of exhausted gas exiting the reactor along the recovery and treatment line;
at least one control device for controlling said at least one first regulation valve and said at least one second regulation valve;
and wherein said at least one control device is adapted to receive a first signal indicative of a discharge flow rate of DRI from the reactor and to produce a second signal for controlling the at least one first regulation valve and a third signal for controlling the least one second regulation valve.

2. The system according to claim 1, wherein there is provided a cooling unit along the bypass duct to cool down said at least one portion of the reducing gas mixture.

3. The system according to claim 2, wherein said cooling unit comprises a water injection device and a gas-liquid separator.

4. The system according to claim 1,
wherein the treatment and feeding line comprises at least one heating or reforming unit;
wherein the recovery and treatment line comprises at least one pumping device for pumping the exhausted gas towards the treatment and feeding line;
and wherein said at least one bypass duct connects a stretch of the treatment and feeding line, placed between said at least one heating or reforming unit and said reactor, to a stretch of the recovery and treatment line placed between said reactor and said at least one pumping device.

5. The system according to claim 1, wherein the treatment and feeding line comprises at least one heating or reforming unit and at least one injection device, arranged downstream of said heating or reforming unit and adapted to inject oxygen into a flow of process gas;
wherein the recovery and treatment line comprises at least one heat exchanger to cool down the exhausted gas exiting the reactor, at least one washing unit for washing the exhausted gas, adapted to wash the exhausted gas with washing water and to separate the exhausted gas from the washing water, at least one condensing unit, arranged downstream of said washing unit, for removing water from the exhausted gas, and at least one pumping device for pumping the exhausted gas towards the treatment and feeding line;
and wherein said at least one bypass duct connects a stretch of the treatment and feeding line located between said at least one heating or reforming unit and the reactor, downstream or upstream of said at least one injection device, to a stretch of the recovery and treatment line, located between the washing unit and the condensing unit.

6. The system according to claim 5, wherein the at least one second regulation valve is adapted to regulate the passage of exhausted gas from the washing unit towards the condensing unit, or, when said washing unit and said condensing unit are merged in a single unit, is adapted to regulate the passage of exhausted gas from said single unit towards the pumping device.

7. The system according to claim 1, wherein there is provided a regulation device for regulating a loading of iron oxides, introduced from above into the reactor.

8. The system according to claim 1, wherein the treatment and feeding line comprises at least one reforming unit for reforming methane;
wherein there are provided an external source for feeding $CO_2$ and $H_2O$ upstream of said reforming unit, and a respective regulation valve for regulating said feeding of $CO_2$ and $H_2O$;
and wherein said at least one control device is also configured to produce a fourth signal for controlling the regulation valve for regulating said feeding of $CO_2$ and $H_2O$.

9. The system according to claim 5, wherein said washing unit and said condensing unit are merged in a single unit.

10. A process for a direct reduction of iron oxides, which can be carried out by means of a system according to claim 1, the process comprising the following steps:

a) feeding said reducing gas mixture into the reduction area of the reactor by means of the treatment and feeding line;
b) recovering and treating the exhausted gas exiting the reactor by means of the recovery and treatment line communicating downstream with said treatment and feeding line;
wherein there is provided a deviation of at least one portion of the reducing gas mixture from said treatment and feeding line to said recovery and treatment line by means of the at least one bypass duct;
wherein there are provided the steps of
regulating the at least one portion of the reducing gas mixture which, by means of said at least one bypass duct, reaches the recovery and treatment line, by means of said at least one first regulation valve;
regulating the passage of exhausted gas exiting the reactor along the recovery and treatment line by means of said at least one second regulation valve;
controlling said at least one first regulation valve and said at least one second regulation valve by means of said at least one control device;
and wherein said at least one control device receives a first signal indicative of a discharge flow rate of DRI from the reactor and produces a second signal, for controlling the at least one first regulation valve, and a third signal for controlling the least one second regulation valve.

11. The process according to claim 10, wherein a cooling of said at least one portion of the reducing gas mixture is provided along the at least one bypass duct, by means of a cooling unit.

12. The process according to claim 11, wherein during a full-performance operating step, different from a starting step, a temperature of the at least one portion of the reducing gas mixture entering the cooling unit is in a range of 850-960° C., while the temperature of said at least one portion of the reducing gas mixture exiting the cooling unit is in a range of 40-180° C.

13. The process according to claim 10, wherein a regulation of an amount of iron oxides loaded from above into the reactor is provided, as a function of an amount of the reducing gas mixture introduced into the reduction area.

14. The process according to claim 10, wherein the regulation of the passage of exhausted gas along the recovery and treatment line is carried out from a washing unit towards a condensing unit, or, when said washing unit and said condensing unit are merged in a single unit, from said single unit towards a pumping device.

15. The process according to claim 10, wherein the deviation of at least one portion of the reducing gas mixture occurs from a stretch of the treatment and feeding line, placed between at least one heating or reforming unit and the reactor, to a stretch of the recovery and treatment line placed between the reactor and at least one pumping device;
or wherein the deviation of at least one portion of the reducing gas mixture occurs from a stretch of the treatment and feeding line, placed between the reactor and a heating or reforming unit, downstream or upstream of at least one injection device placed downstream of said heating or reforming unit and adapted to inject oxygen in a flow of process gas,
to a stretch of the recovery and treatment line placed between at least one washing unit of the exhausted gas, adapted to wash the exhausted gas with washing water and to separate the exhausted gas from the washing water, and at least one condensing unit, placed downstream of said washing unit, for removing water from the exhausted gas;

or wherein, when said washing unit and said condensing unit are merged in a single unit, the deviation of at least one portion of the reducing gas mixture occurs from a stretch of the treatment and feeding line, placed between the reactor and said heating or reforming unit, downstream or upstream of said at least one injection device, to a stretch of the recovery and treatment line placed between said single unit and a pumping device.

16. A direct reduction system for a direct reduction of iron oxides, comprising:
- a reactor having a reduction area and being adapted to be loaded from above with said iron oxides;
- a treatment and feeding line for treating process gas, thus obtaining a reducing gas mixture, and for feeding said reducing gas mixture into the reduction area;
- a recovery and treatment line for recovering and treating an exhausted gas exiting the reactor, communicating upstream with the reactor and downstream with said treatment and feeding line;
- wherein at least one bypass duct is provided, adapted to divert at least one portion of said reducing gas mixture from said treatment and feeding line to said recovery and treatment line;
- wherein there are provided
- at least one first regulation valve for regulating the portion of the reducing gas mixture which, by means of said at least one bypass duct, reaches the recovery and treatment line;
- at least one second regulation valve for regulating a passage of exhausted gas exiting the reactor along the recovery and treatment line;
- at least one control device for controlling said at least one first regulation valve and said at least one second regulation valve;
- and wherein said at least one control device is adapted to receive a first signal indicative of a discharge flow rate of DRI from the reactor and to produce a second signal for controlling the at least one first regulation valve and a third signal for controlling the least one second regulation valve;
- wherein the treatment and feeding line comprises at least one heating or reforming unit and at least one injection device, arranged downstream of said heating or reforming unit and adapted to inject oxygen into a flow of process gas;
- wherein the recovery and treatment line comprises at least one heat exchanger to cool down the exhausted gas exiting the reactor, at least one washing unit for washing the exhausted gas, adapted to wash the exhausted gas with washing water and to separate the exhausted gas from the washing water, at least one condensing unit, arranged downstream of said at least one washing unit, for removing water from the exhausted gas, and at least one pumping device for pumping the exhausted gas towards the treatment and feeding line;
- wherein said at least one bypass duct connects a stretch of the treatment and feeding line located between said at least one heating or reforming unit and the reactor, downstream or upstream of said at least one injection device, to a stretch of the recovery and treatment line, located between said at least one washing unit and the condensing unit.

17. The system according to claim 16, wherein the at least one second regulation valve is adapted to regulate the passage of exhausted gas from said at least one washing unit towards the condensing unit, or, when said at least one washing unit and said condensing unit are merged in a single unit, is adapted to regulate the passage of exhausted gas from said single unit towards the pumping device.

18. The system according to claim 16, wherein said at least one washing unit and said condensing unit are merged in a single unit.

* * * * *